H. E. WHITE.
POWER TRANSMISSION APPARATUS.
APPLICATION FILED JAN. 25, 1911.
1,017,355.
Patented Feb. 13, 1912.
4 SHEETS—SHEET 1.
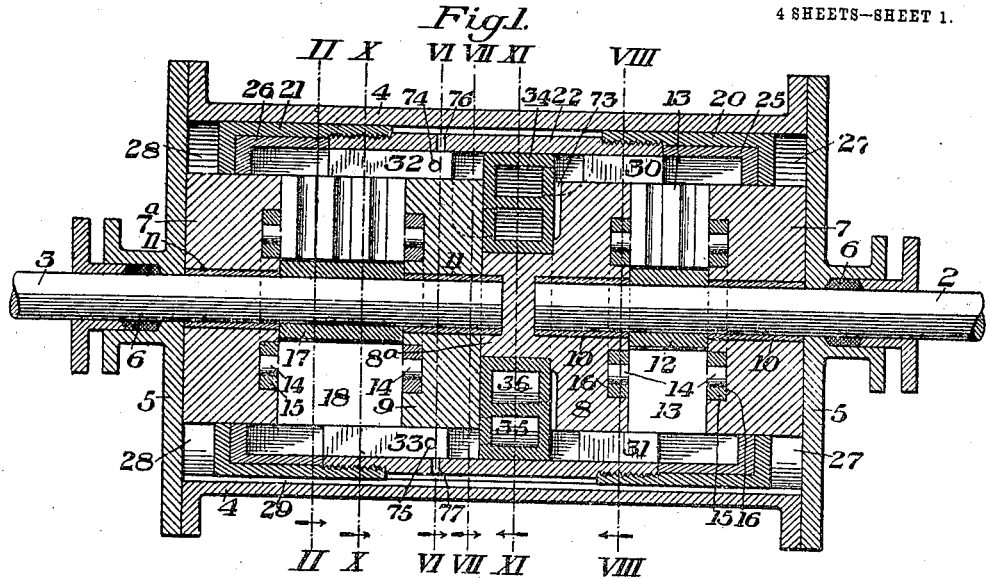
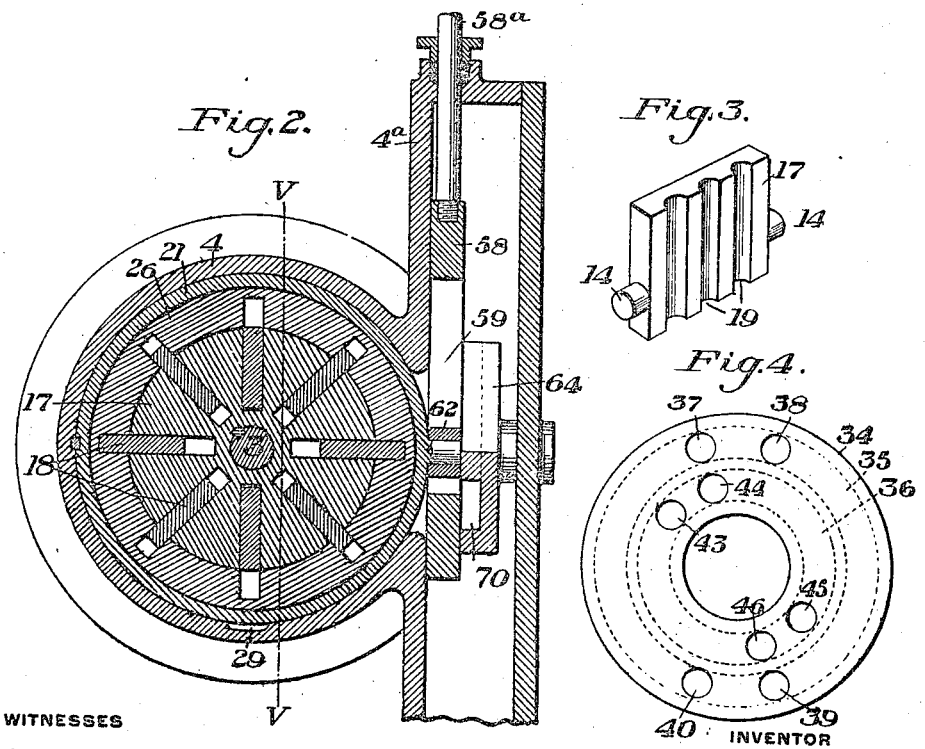

H. E. WHITE.
POWER TRANSMISSION APPARATUS.
APPLICATION FILED JAN. 25, 1911.
1,017,355.
Patented Feb. 13, 1912.
4 SHEETS—SHEET 2.
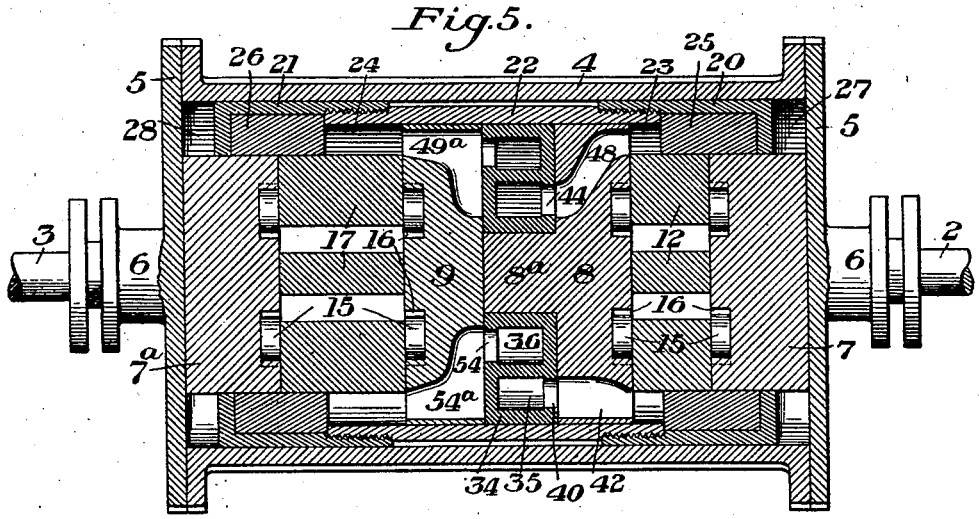
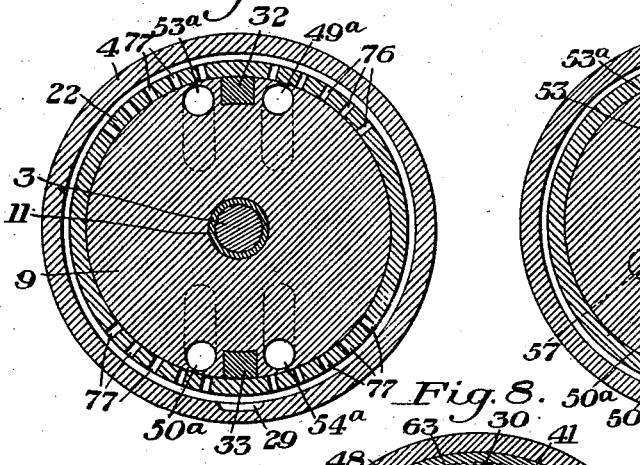
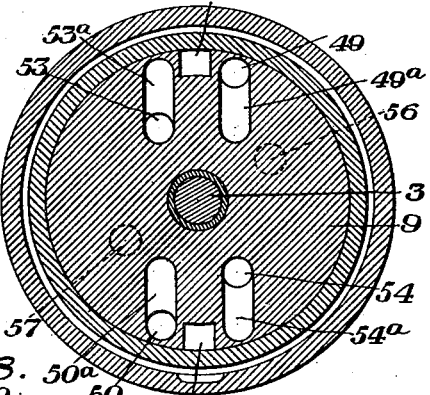
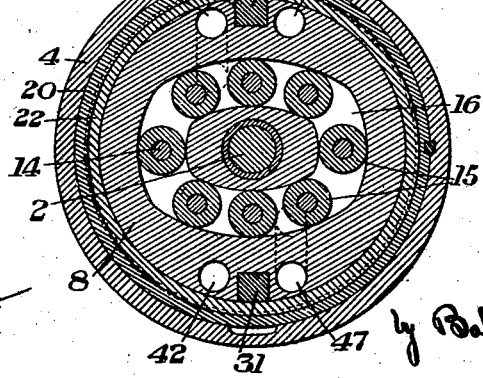
WITNESSES
R A Balderson
W Tamariss
INVENTOR
H. E. White H. E. WHITE.
POWER TRANSMISSION APPARATUS.
APPLICATION FILED JAN. 25, 1911.
1,017,355.
Patented Feb. 13, 1912.
4 SHEETS—SHEET 3.
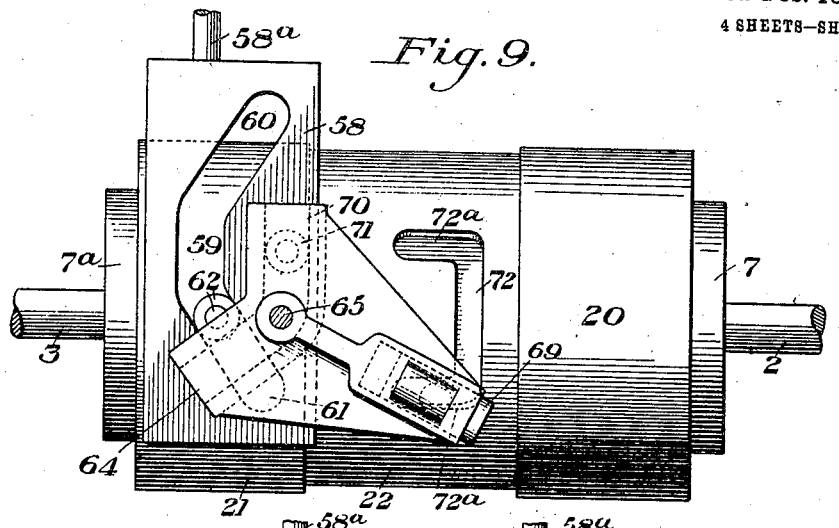
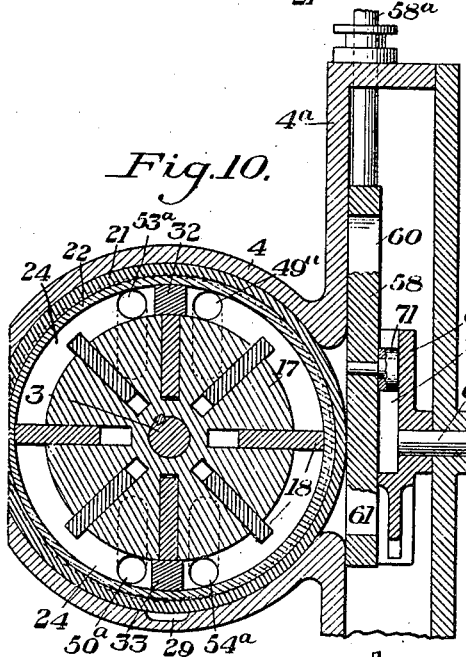
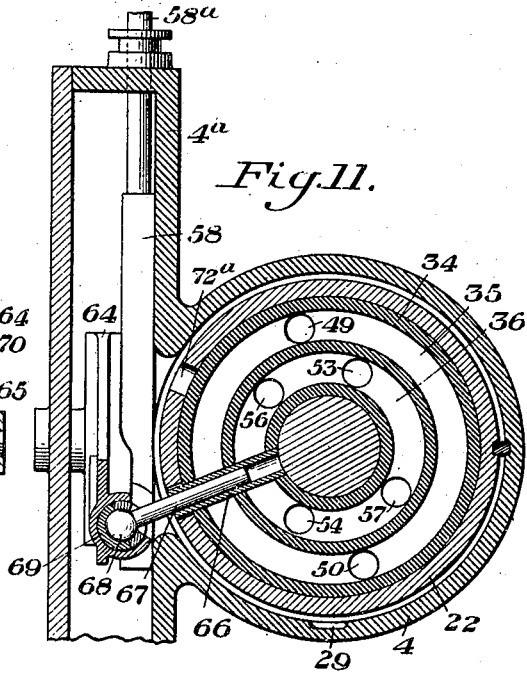
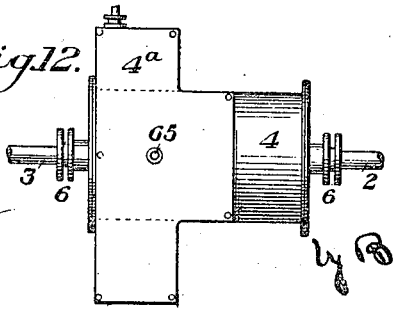
WITNESSES
R. A. Balderson
W. Famariss
INVENTOR
H. E. White
by Bakewell, Byrnes & Parmelee,
his Attys.

H. E. WHITE.
POWER TRANSMISSION APPARATUS.
APPLICATION FILED JAN. 25, 1911.

1,017,355.

Patented Feb. 13, 1912.
4 SHEETS—SHEET 4.

WITNESSES
R A Balderson
W. Famariss

INVENTOR
H. E. White,
by Bakewell, Byrnes, Parmelee
his Attys

UNITED STATES PATENT OFFICE.

HERBERT E. WHITE, OF YOUNGSTOWN, OHIO.

POWER-TRANSMISSION APPARATUS.

1,017,355.  Specification of Letters Patent.  Patented Feb. 13, 1912.

Application filed January 25, 1911. Serial No. 604,573.

*To all whom it may concern:*

Be it known that I, HERBERT E. WHITE, a resident of Youngstown, in the county of Mahoning and State of Ohio, have invented a new and useful Improvement in Power-Transmission Apparatus, of which the following is a full, clear, and exact description, reference being had to the accompanying drawings, forming part of this specification, in which—

Figure 13:
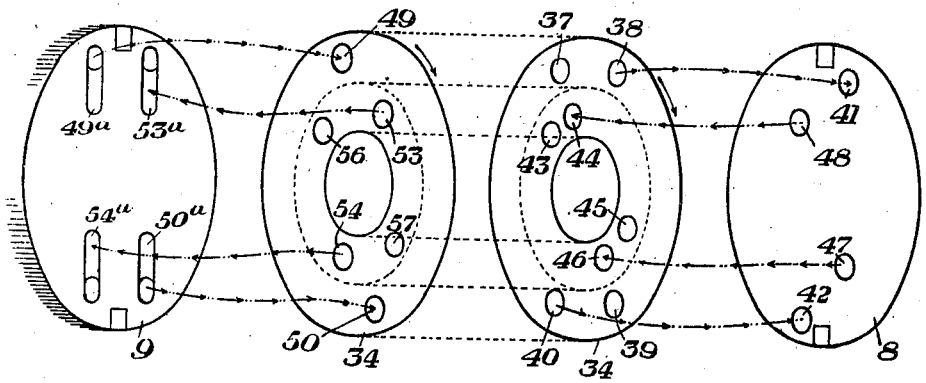
Figure 14:
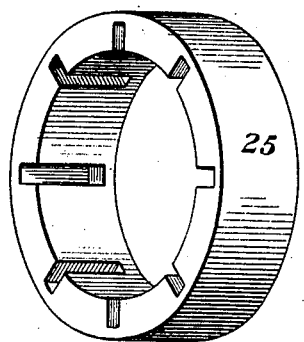
Figure 15:
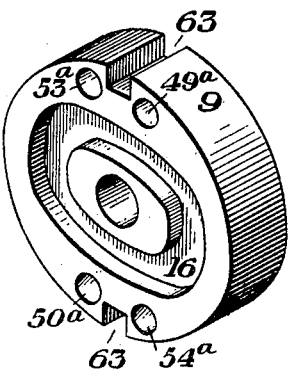
Figure 16:
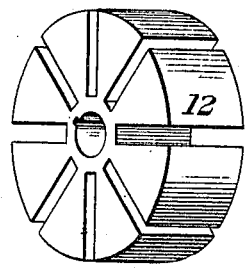

Figure 1 is a longitudinal section of a power transmission apparatus embodying my invention; Fig. 2 is a section on the line II—II of Fig. 1; Fig. 3 is a perspective view of one of the movable piston blades; Fig. 4 is an end view of the reversing and distributing valve, looking from the pump side of the apparatus; Fig. 5 is a longitudinal section taken on a different plane from that of Fig. 1, being on the line V—V of Fig. 2; Figs. 6, 7 and 8 are sections on the lines VI—VI, VII—VII and VIII—VIII, respectively, of Fig. 1; Fig. 9 is a side elevation of the apparatus with the outer casing removed; Figs. 10 and 11 are sections taken on the lines X—X and XI—XI, respectively, of Fig. 1; Fig. 12 is a side elevation of the apparatus; Fig. 13 is a perspective diagram looking from the pump end, and showing the arrangement of ports and the circulation therethrough; Fig. 14 is a perspective view of one of the regulator members; Fig. 15 is a similar view of one of the filler pieces with the cam track therein; and Fig. 16 is a perspective view of the carrier element of the pump. The arrows on Fig. 1 indicate the direction of view of the several sections taken thereon.

My invention relates to power transmission apparatus of the class in which a liquid is employed as a medium of power transmission, and is designed to provide apparatus of this character by means of which the speed of the driven member may be widely varied without changing the amount of power transmitted.

A further object of my invention is to provide power transmission apparatus which will eliminate the use of change gearings, such as are ordinarily employed, and to provide means applicable for a variety of different uses.

The nature of my invention will be best understood by reference to the accompanying drawings, in which I have illustrated the preferred embodiment thereof, and which will now be described, it being premised, however, that various changes may be made in the mechanical construction and arrangement of the several parts by those skilled in the art, without departing from the spirit and scope of my invention as defined in the appended claims.

In these drawings, the numeral 2 designates a driving shaft which may be driven by a prime motor of any suitable or usual character.

3 is a driven shaft to which power is to be transmitted from the shaft 2.

4 designates an outer shell or casing having end caps 5, provided with stuffing boxes 6, for the shafts 2 and 3, where they pass therethrough.

7 is a circular block which is fixedly secured to the right-hand cap 5, or which is prevented from rotating in any other suitable manner. 7ª is a similar block, which is secured to the cap at the opposite end.

8 is a circular filler piece which is separated from the inner side of the block 7 by a space in which the pump elements presently to be described are mounted, and 9 is a circular block which abuts against a central extension 8ª of the block 8, and between which and the inner face of the block 7ª are mounted the motor elements presently to be described. The shaft 2 is provided with suitable bush bearings 10, in the blocks 7 and 8, and the shaft 3 is provided with similar bush bearings 11, in the blocks 7ª and 9.

The pump comprises a carrier 12, which is mounted on the shaft 2 between the blocks 7 and 8 and which is formed with a plurality of radial slots to receive the piston blades or vanes 13. Each of these blades or vanes is preferably of the form shown in Fig. 3, being provided with laterally projecting studs 14, having rollers 15 loosely mounted thereon. These rollers are arranged to rotate in cam slots 16, which are formed in the opposing faces of the blocks 7 and 8, as clearly shown in Figs. 1, 5, 8 and 15. These cam slots are of such form that the blades will be advanced and retracted as the carrier 12 is rotated with the shaft 2.

The motor which is mounted on the shaft 3 between the blocks 7ª and 9 is of similar construction to the pump, and consists of a carrier, as 17, having radial slots to receive the blades 18, which are similar to the blades 13, first described, and which are provided with similar studs 14 and rollers 15, the latter traveling in cam grooves in the opposed faces of the blocks 7ª and 9, and which cam grooves are the same in form as those of the blocks 7 and 8. The blades or vanes are also provided with grooves or other openings 19, for a purpose which will hereinafter appear.

Placed within the outer casing and held against rotation, but free to have a limited longitudinal movement therein is an inner casing which is shown as composed of the two end members 20 and 21, and the intermediate member 22, upon the end portions of which the end members are screw-threaded. The end members 20 and 21 are separated from the periphery of the pump and motor carriers by annular spaces or chambers 23 and 24, respectively. Arranged in the chamber 23 inside of the casing member 20 and secured thereto to move longitudinally therewith, is a regulating member 25, having therein a plurality of slots to receive the edges of the blades or vanes when the latter are projected; and placed in the space or chamber 27 and secured to the casing section 21 to move longitudinally therewith, is a similar regulating member 26, also having slots to receive the blades or vanes of the motor when the latter are projected.

27 is an annular space within the outer casing at one end of the end casing member 20, and 28 is a similar space between the inner casing member 21 and the adjacent cap 5. These two spaces 27 and 28 are connected by a longitudinally extending passage 29 in the outer casing, see Fig. 2.

30 and 31 are division pieces arranged at diametrically opposite points within the annular space or chamber at the pump end of the apparatus, as most clearly seen in Figs. 1 and 8, these division pieces serving to divide this annular space or chamber into two compartments. 32 and 33 are similar division pieces which are arranged in the annular space or chamber at the motor end of the apparatus (see Figs. 1, 6 and 10) and which divide said space or chamber into two compartments, as most clearly seen in Fig. 10.

34 is a reversing liquid-distributing valve of annular form, which is rotatably mounted on the central hub portion of extension 8ª of the block 8. This valve has therein two annular concentric chambers 35 and 36. The valve has ports 37, 38, 39, 40, 43, 44, 45 and 46, opening through the side thereof nearest the pump chamber, the ports 37, 38, 39 and 40 leading from the outer valve chamber 35, while the ports 43, 44, 45 and 46 lead from the inner chamber 36. While the port arrangement is shown in part in a number of figures of the drawing, the system of ports, as a whole, and the circulation therethrough will be best understood by reference to the diagram shown in Fig. 13. The block 8 is provided with the four ports 41, 42, 47 and 48 which communicate with the annular pump chamber. The opposite side of the valve has the ports 49, 50, 53, 54, 56 and 57, ports 49 and 50 communicating with the outer valve chamber 35, and ports 53, 54, 56 and 57 communicating with the inner valve chamber 36. The block 9 has the four ports 49ª, 50ª, 53ª and 54ª which lead to the annular motor chamber. The mouths of these ports 49ª, 50ª, 53ª and 54ª, adjacent to the valve are enlarged or slotted, as shown, so that the port 53ª may communicate with either of the ports 49 or 53, and 49ª with either 49 or 56; and the port 54ª may communicate with either of the ports 50 or 54, and 50ª with either 50 or 57. The circulation through these ports will now be described.

In the normal direction of rotation of the shaft 3, and assuming the shaft 2 to be driven constantly by its prime motor in a clockwise direction and premising that all the space within the inner casing, including the valve chambers and ports, is filled with a suitable liquid, such as oil or glycerin, the operation and circulation is as follows: Liquid is drawn out through the valve ports 38 and 40 and passes through the ports 41 and 42 into the annular pump chamber these two ports communicating with said chamber at opposite sides of the division pieces 30 and 31, as clearly shown in Fig. 8. The positive rotation of the pump causes the liquid to be forced around the pump chamber between the division pieces and forced out through the ports 47 and 48 and into the valve chamber through the ports 44 and 46. The liquid is forced from the inner valve chamber 36 to the motor chamber through the ports 53 and 54, and enters said chamber at opposite sides of the division pieces 32 and 33. By its pressure against the motor blades or vanes, it causes the rotation of the motor, together with the shaft 3, and the liquid escapes through the ports 49ª and 50ª and returns to the outer valve chamber through the ports 49 and 50 to be again drawn into the pump and circulated therethrough. When the shaft 3 is to be driven in the reverse direction without reversing the shaft 2, the valve is actuated by means hereinafter to be described, so that the ports 37 and 39 take the place of the ports 38 and 40, and the ports 43 and 45 take the place of the ports 44 and 46. In effect, the port 37 is simply an extension of the port 38, and the port 39 an extension of the port 40, the port 43 an extension of the port 44, and the port 45 an extension of the port 46, so that the direction of circulation of the liquid through the pump chamber is not changed by this reversal of the valve. This reverse movement of the valve also connects the port 49 with the port 53ª and the port 50 with the port 54ª. Ports 53 and 54 are disconnected, respectively, from the ports 53ª and 54ª, and the ports 56 and 57 are brought into connection with the ports 49ª and 50ª, respectively. This, as will be readily seen, effects a reverse circulation through the motor, since the liquid instead of entering the motor chamber through the ports 53ª and 54ª and exhausting through the ports 49ª and 50ª will enter through the ports 49ª and 50ª and will exhaust through the ports 53ª and 54ª. The speed of the shaft 3 will approximately equal that of the shaft 2 (leakage and other losses being taken into consideration) so long as the effective area of the pump and piston blades remains substantially the same. If the effective area of either sets of blades be changed, the relative speeds of the two shafts will be varied accordingly, but without any change in the power transmitted, since increase in speed of the shaft 3 relatively to the shaft 2, will decrease the torque on the shaft 3, while a decrease in the speed of the shaft 3 will be attended by a proportionate increase in the torque effort thereon. It will be readily seen, therefore, that by an endwise movement of the regulating members 25 and 26, to thereby close more or less of the annular pump and motor chambers, the relative effective areas of the pump and motor and their capacity can be varied at will. Thus, if the inner casing which carries these regulating members be moved to the right, looking at Fig. 1, the annular pump space will be lengthened correspondingly to increase the capacity of the pump. At the same time, the annular motor space will be decreased to diminish the capacity of the motor. Each of these effects increases the speed of rotation of the shaft 3 relatively to the speed of rotation of the shaft 2. On the contrary, if the inner casing be moved to the left, the pumping capacity will be correspondingly diminished and that of the motor enlarged. Each of these effects a reduction in speed, but with an increase in torque on the shaft 3. Except, therefore, for variations in leakage and frictional losses, the power transmitted is constant for all speeds of the shaft 3.

It will be understood from Fig. 2 that the cam track projects the motor blades or vanes into the slots of the regulating members, so that the regulating members rotate with the pump and motor elements. The cam slots 16 are, of course, so arranged that the blades or vanes will be retracted to their innermost positions at the time each of them passes one of the division pieces, as clearly seen in Fig. 10.

The inner stationary blocks 8 and 9 are prevented from moving longitudinally by the other parts contained within the casing, there being just space enough between the heads 5, 5 to accommodate the parts 7, 12, 8, 9, 17 and 7ª. These blocks 8 and 9 are prevented from turning by the blocks 30, 31, 32 and 33, which are fastened to the inner casing 22 and project into the slots 63 which are cut in the parts 8 and 9 in the nature of key-ways. The inner casing 22 is keyed to the outer casing 4, as seen at the left-hand side of Fig. 2, preventing the turning of the part 22, but leaving such part free to slide longitudinally. The blocks 8 and 9 are supported laterally by the inner casing 22, into which they fit. The blocks 30, 31, 32 and 33 are moved simultaneously being fastened to the inner casing 22.

Various mechanisms may be employed for effecting the endwise movement of the inner casing to regulate the capacities of the pump and motor, as above described, and also for shifting the valve. The means which are shown in the drawings for these purposes will now be described, reference being had more particularly to Figs. 2, 9, 10, 11 and 12.

The outer casing of the apparatus is provided with the extension 4ª, to form a closure for a vertically movable slide plate 58. This slide plate has cut therein a cam slot which has a straight central portion 59 and angularly directed end portions 60 and 61. The end section 21 of the inner casing has a stud roller 62, projecting therefrom and engaging this cam slot. It will be apparent that when the slide is actuated to force the stud roller 62 into the angular end portions of the cam slot, the casing will be moved endwise in one direction or the other to the extent to which the slide is moved. The vertical central portion 59 of the slot is occupied by the stud roller 62 when the parts are in their neutral position. By moving the inner casing to the left (looking at Fig. 1) to its extreme position, it will be seen that the pump chamber can be entirely closed by the regulator 25, thus eliminating the pumping capacity entirely and stopping the shaft 3 without stopping the shaft 2. In order to permit this movement of the inner casing with the regulators and the division pieces, the blocks 8 and 9 are slotted to receive the division pieces, as shown at 63, in Figs. 7 and 8.

64 is a rocking arm for operating the valve, this arm being pivoted to the casing extension 4ª at 65. The valve is provided with a tubular radially extending bearing sleeve 66 (see Fig. 11) in which is arranged to telescope a rod 67, having a ball end 68, which is engaged in a ball-shaped cavity in a split bearing block 69, this block being circular and seated in a circular hole in the rocking arm 64. The arm 64 has therein an angular groove 70, which is engaged by a stud roller 71, carried by the slide 58.

72 is a slot which is cut in the inner casing for the clearance of the rod 67, this slot having a vertical central portion and horizontal end portions 72ª.

By reference to Fig. 9, in which the stud roller 62 is shown approaching its neutral position, in which position the valve is to be reversed, it will be apparent that a further downward movement of the slide 58 will cause the rocking arm 64 to rotate slightly on its pivot 65, thereby raising its right-hand end and rotating the valve by means of the rod 67, telescoping in the bearing sleeve 66. The clearance slot 72 is of such shape that the valve can not be rotated except when the inner casing is in its neutral position, or in other words, when the shaft 3 is at rest. The angular form of this slot is such that when the stud roller 71 carried by the slide 58 is depressed, the arm 64 is turned until the lower portion of the groove 70 extends in a vertical direction. The valve is then in its reversed position. The slide 58 may be operated in any suitable manner. In the drawing, I have illustrated a connecting rod 58ª, which may lead to any suitable operating mechanism. It will be apparent that through the movement of this single rod, the entire change of speed ratios in either direction is obtained from a dead stop to any speed up to the maximum for which the mechanism is designed. No clutch is necessary, and the number of speed changes is not limited. In order to change the speed or to reverse it is not necessary to disengage the driven shaft or to in any way interfere with the drive.

I preferably provide the block 8 with an auxiliary port 73 (see Fig. 1) which is arranged to connect the ports 37 and 44 of the valve when the parts are in neutral position, thereby connecting the two compartments 35 and 36 of the valve.

The passage 29 of the casing, which connects the end spaces 27 and 28, is provided in order to allow the fluid to distribute between these two chambers when the inner casing is moved endwise in regulating the entire space within the casing being filled with the liquid. It will be obvious, however, that instead of providing mechanical means for moving the inner casing endwise in regulating, the chambers 27 and 28 could be connected with a source of hydraulic power, in which case the connecting passage 29 would be omitted.

The grooves 19 in the faces of the piston blades or vanes are provided so that the liquid can readily pass therethrough when the blades are forced outwardly into the slots in the regulating members.

The division pieces 32 and 33 are preferably provided with the holes or ports 74 and 75, respectively, (see Fig. 1) connecting the two compartments of the motor chamber; and the inner casing member 22 with the ports 76 and 77 (see Fig. 6) leading therethrough. The object of these ports is to permit the shaft 3 to turn freely when the parts are in their neutral position. The ports are closed when the apparatus is in running condition, but are opened when the inner casing and the regulating members are moved to the neutral position. The ports 74 and 75 simply permit the fluid with which the mechanism is filled to pass through the blocks 32 and 33; or, in other words, they act as by-pass ports. The ports 76 and 77 also act as by-passes, by permitting the fluid to pass from in front of the blades or pistons 18 through the walls of the inner casing 22 into the annular space between the inner and outer casings 22 and 4, whence it is free to again enter the inner casing behind the other blades or vanes. The ports 74 and 75 supplement the ports 76 and 77.

In practice, small passages may be left on the periphery of the valve 34, so that the spaces between said valve and the blocks 30 and 32 and 31 and 33 may be placed in communication, to thereby permit free movement of the said blocks.

It will also be obvious that the regulating action might be obtained in a modified degree by changing the capacity of only one of the elements, either the pump or the motor, and the broader of the appended claims are intended to cover such a modification. I prefer, however, to regulate by changing the capacity of both the pump and motor, since the pressure on the cylinder regulating blocks is balanced, and they are enabled to be easily held in position. The motion of the inner casing is preferably so limited that the regulating blocks can never become disengaged from the blades or vanes.

While I have shown my invention as applied to the transmission of power, where the driving shaft and the driven shaft are in longitudinal alinement, it will be obvious that my invention is not limited thereto, and that the two shafts might be at various angles; for instance, at right angles to each other. It will also be obvious that instead of mounting all the parts in a single casing, the motor and pump parts of the apparatus may be separately mounted, in which case proper connecting passages or pipes will, of course, be provided to and from the valve. Furthermore, I do not desire to limit myself to the particular forms of pump and motor which I have herein shown and described, since it will be obvious that other types may be employed. Any suitable valve mechanism may also be employed, and various other changes may be made in the construction and arrangement of the details of the apparatus, within the scope of the appended claims.

I claim:

1. In power-transmission apparatus, a driving element, a pump actuated thereby, a motor driven by the pump, a driven element to which the motor is connected, and regulating means whereby the speed of the motor and driven element may be varied relatively to the speed of the driving element without changing the power transmitted, the pump and motor having radially reciprocating piston blades of constant stroke and which rotate therewith, substantially as described.

2. In power-transmission apparatus, a driving element, a pump actuated thereby, a motor driven by the pump, a driven element actuated by the motor, and means for increasing or decreasing the speed of the motor and its driven element and for correspondingly decreasing or increasing the torque exerted by said element, the pump and motor having radially reciprocating piston blades of constant stroke and which rotate therewith, substantially as described.

3. In power-transmission apparatus, a driving element, a pump actuated thereby, a motor driven by the pump, a driven element carrying the motor and driven thereby, and means for varying the capacity of the motor, the pump and motor having radially reciprocating piston blades of constant stroke and which rotate therewith, substantially as described.

4. In power-transmission apparatus, a driving element, a pump actuated thereby, a motor driven by the pump, a driven element carrying the motor and driven thereby, and means for varying the effective piston area of the motor, the pump and motor having radially reciprocating piston blades of constant stroke and which rotate therewith, substantially as described.

5. In power-transmission apparatus, a driving element, a pump actuated thereby, a motor driven by the pump, a driven element carrying the motor and driven thereby, and means for varying the effective piston area of the pump, the pump and motor having radially reciprocating piston blades of constant stroke, substantially as described.

6. In power-transmission apparatus, a driving element, a pump actuated thereby, a motor driven by the pump, a driven element carrying the motor and driven thereby, and connected and simultaneously longitudinally movable means for varying the capacity of both the motor and the pump, substantially as described.

7. In power-transmission apparatus, a driving element, a pump actuated thereby, a motor driven by the pump, a driven element carrying the motor and driven thereby, and connected and simultaneously longitudinally movable means for varying the effective piston areas of both the motor and the pump, substantially as described.

8. In power-transmission apparatus, a driving element, a pump actuated thereby, a motor driven by the pump, a driven element carrying the motor and driven thereby, and longitudinally movable means for increasing and decreasing the capacity of the pump and simultaneously decreasing or increasing the capacity of the motor to substantially the same extent, substantially as described.

9. In power-transmission apparatus, a driving element, a pump actuated thereby, a motor driven by the pump, a driven element carrying the motor and driven thereby, a closed liquid circulating system connecting the motor and pump, and a distributing and reversing valve interposed in said system and means rotating with the motor and pump for varying the capacity thereof, substantially as described.

10. In power-transmission apparatus, a driving element, a pump actuated thereby, a motor driven by the pump, and connected to an element driven thereby, a closed liquid circulating system connecting the pump and motor, means for varying the capacity of the motor, and means for reversing the direction of rotation of the motor relatively to that of the pump and means rotating with the motor and pump for varying the capacity thereof, substantially as described.

11. In power-transmission apparatus, a driving element, a pump actuated thereby, a motor driven by the pump, and connected to an element driven thereby, a closed liquid circulating system, and a distributing and reversing valve interposed in said system, said valve having a plurality of ports leading to both the pump chamber and the motor pump, and means rotating with the motor and pump for varying the capacity thereof, substantially as described.

12. In power-transmission apparatus, a driving element, a pump actuated thereby, a motor driven by the pump, a driven element to which the motor is attached, a closed liquid circulating system connecting the motor and pump, and longitudinally movable means for increasing or decreasing the capacity of the pump and simultaneously decreasing or increasing the capacity of the motor to a similar extent, said means also being adapted to entirely eliminate the pumping capacity, substantially as described.

13. In apparatus of the character described, a rotary pump element of the type having radially reciprocating piston blades and having a surrounding pump space or chamber, and a regulating device movable longitudinally on the pump element to thereby vary the capacity of said chamber, substantially as described.

14. In apparatus of the character described, a rotary motor element having radially reciprocating piston blades, and also having a surrounding pump space or chamber, and a regulating device movable longitudinally on the motor element to vary the capacity of said chamber, substantially as described.

15. In power-transmission apparatus, a rotary pump element, a rotary motor element, each of said elements having a surrounding space or chamber, each of said elements having radially reciprocating piston blades, a closed liquid circulating system connecting said spaces or chambers, a regulating member movable longitudinally in each of said chambers to vary the capacity thereof, and means for simultaneously actuating the two regulating members, substantially as described.

16. In power-transmission apparatus, the combination with a rotary element having a plurality of radially movable piston blades or vanes, of a regulating member mounted on the rotary member and having slots therein to be engaged by the blades or vanes, said regulating member being also movable longitudinally on the rotary member to thereby vary the effective capacity of the blades or vanes, substantially as described.

17. In power-transmission apparatus, a driving shaft, a pump element mounted thereon, a driven shaft, a motor element carried thereby, an outer casing, an inner endwise movable casing, a closed liquid circulating system connecting the pump and motor elements, and regulators for varying the capacity of the pump and motor elements carried by the inner casing and movable endwise therewith, substantially as described.

18. In power-transmission apparatus, a driving shaft, a pump element carried thereby, a driven shaft, a motor element for driving said shaft and connected thereto, a closed liquid circulating system connecting the pump and motor elements, a reversing and distributing valve interposed in said system, a regulator for varying the capacity of the pump and motor elements and arranged to revolve with said elements, and a single actuating mechanism for the valve and for the regulator, substantially as described.

19. In power transmission apparatus, the combination with a driving member, a pump carried thereby, a driven member, a motor for operating the driven member, the apparatus having a closed liquid circulating system connecting the pump and motor, and relief ports for the motor arranged to be automatically brought into action to permit the free motion of the motor element when the pumping capacity of the pump element is eliminated; substantially as described.

20. In power transmission apparatus, the combination with a driving member, a pump carried thereby, a driven member, a motor for actuating the driven member, the apparatus having a closed liquid circulating system connecting the pump and motor, means for eliminating the pumping capacity of the pump, and means arranged to be automatically brought into operation by the elimination of the pumping capacity of the pump to prevent the locking of the liquid in the motor chamber when the pumping capacity of the pump is eliminated; substantially as described.

21. In apparatus of the character described, a rotary element having radially reciprocating piston blades of constant stroke, a chambered casing for said element, and a regulating device rotatable with said element, and having slots to receive said blades, said device being movable longitudinally over the element to cover a greater or less area of said blades, and thereby vary the capacity of the said elements; substantially as described.

In testimony whereof, I have hereunto set my hand.

HERBERT E. WHITE.

Witnesses:
O. D. KAISER,
CHAS. H. CARR.